United States Patent [19]

Raymond

[11] Patent Number: 4,706,904
[45] Date of Patent: Nov. 17, 1987

[54] CASSETTE ASSEMBLY, FOR USE WITH, AND IN COMBINATION WITH, A ROLLED SHEET MATERIALS DISPENSER

[76] Inventor: Gary E. Raymond, 755 S. Rainbow Dr., Hollywood, Fla. 33021

[21] Appl. No.: 850,507

[22] Filed: Apr. 8, 1986

[51] Int. Cl.⁴ .................. B65D 85/67; B65H 19/00; G03B 1/04; G03B 17/26
[52] U.S. Cl. ..................... 242/55.53; 206/409; 242/71.1; 242/71.7
[58] Field of Search ............. 242/55.53, 71.1, 71.7; 206/409

[56] References Cited

U.S. PATENT DOCUMENTS

| | | | |
|---|---|---|---|
| 2,719,679 | 10/1955 | Nerwin et al. | 242/71.1 |
| 3,603,528 | 9/1971 | Kingsley et al. | 242/71.1 X |
| 3,752,302 | 8/1973 | Branibar | 242/71.1 X |
| 4,420,120 | 12/1983 | Raymond | 242/71.1 X |
| 4,455,905 | 6/1984 | Raymond | 242/71.7 X |
| 4,535,664 | 8/1985 | Raymond | 242/55.53 X |

*Primary Examiner*—Stuart S. Levy
*Assistant Examiner*—Thomas R. Hannon
*Attorney, Agent, or Firm*—Bernard J. Murphy

[57] ABSTRACT

The Cassette Assembly has a prominent out-feeding section coupled to and projecting from a sheet materials confining section for nestably mating with a trough therefor formed in a sheet materials dispenser. The trough has diminishing dimensions inwardly thereof, and an inner portion with a specific width. The out-feeding section of the Cassette Assembly is so constructed as to have a complementary, i.e., substantially equal, overall width dimension across a portion thereof to form a light-sealing, light-tight, fit of such portion with the inner portion of the trough. In a first embodiment thereof, the out-feeding section of the Cassette Assembly defines the light-tight, sealing width dimension of the portion thereof of its basic, plastic construction. In other embodiments, the sealing width dimension is formed, effectively, by the expedient of fixing strips of light-sealing material on the outer walls of the out-feeding section of the Cassette Assembly.

12 Claims, 7 Drawing Figures

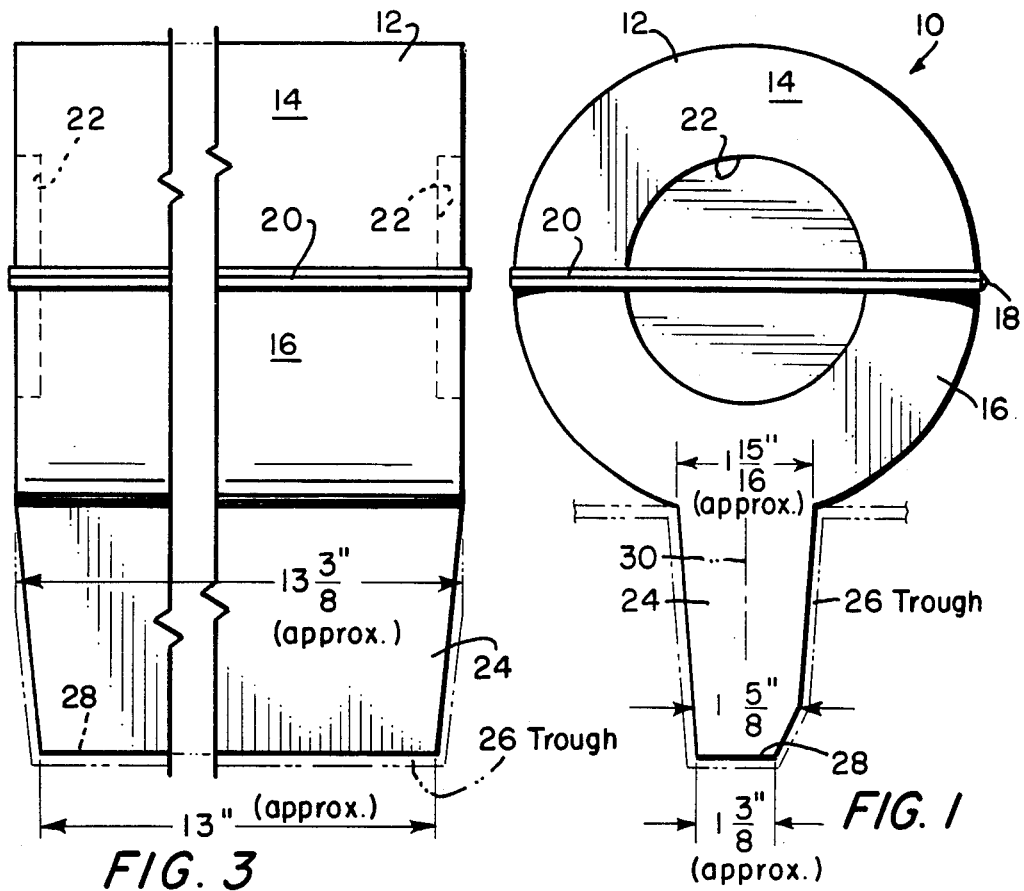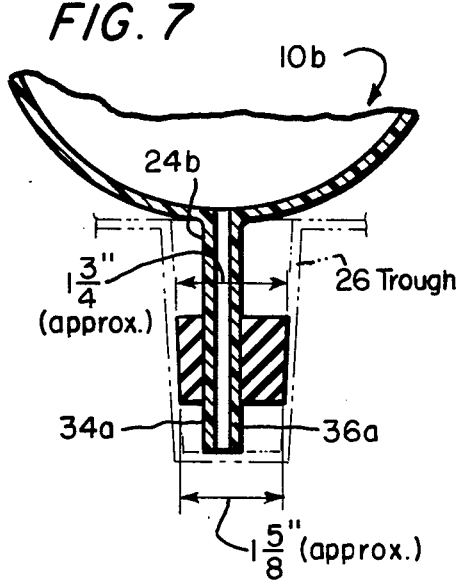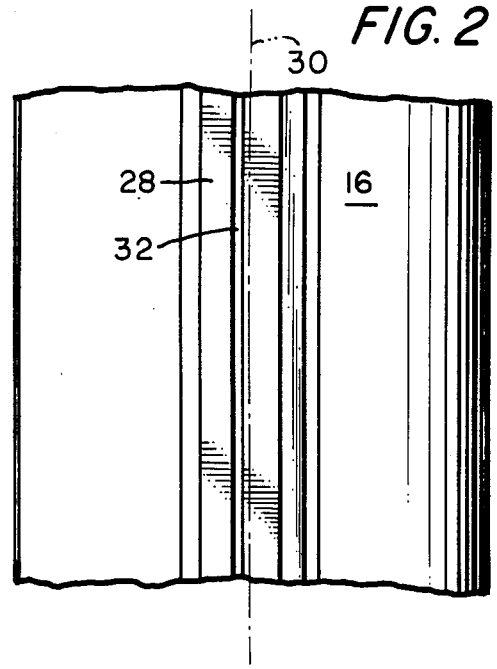

CASSETTE ASSEMBLY, FOR USE WITH, AND IN COMBINATION WITH, A ROLLED SHEET MATERIALS DISPENSER

This invention pertains to cassettes, and in particular to cassette assemblies especially configured to be used with rolled sheet materials and for mating thereof with rolled sheet materials dispensers.

Cassettes for rolled sheet materials are well known in the technology to which the invention pertains, at least from my own patents, namely, utility U.S. Pat. No. 4,420,120, issued on Dec. 13, 1983, for a "Cassette for Sheet Photographic Materials", and design U.S. Pat. No. Des. 276,439, issued Nov. 20, 1984, for a "Cassette for Photographic Roll Materials". Further, rolled sheet materials dispensers are equally well known, and such means disclosed in my utility U.S. Pat. Nos. 4,455,905, and 4,535,664, issued on June 26, 1984 and Aug. 20, 1985, respectively, for "Dispenser Means for Rolled Sheet Materials", are surely exemplary of these.

My patented Dispenser Means comprised a trough into which an out-feeding section of my patented Cassette was matingly receiveable. The trough had substantially parallel walls and the out-feeding section of the cassette could effect a somewhat light-sealing engagement therealong. However, it was largely academic as to whether the nesting, and confronting walls of the cassette and trough defined a light seal therebetween, as the cassette itself was light-tight. The trough and cassette of my prior conception had camming means which cooperated to broach a leading nose of the cassette out-feeding section. In this way, with the nose intimately engaged astride a slot in the dispenser, the camming means permitted the roll materials to be payed out from the cassette and fed through the slot.

The cassette defined by my aforesaid utility patent was so constructed that, once the cassette was closed upon the therein confined roll sheet materials, it could not be reopened without being destroyed in the process. The purpose here, simply, was to insure that only the fine, quality roll sheet materials set into the cassette, when first filled, would be the same upon reaching the customer. It was my purposeful intention that the cassette not be re-opened to accept a substitute supply of roll sheet materials. However, there are customers who wish to re-fill the cassette after it has been emptied of its initial contents. Too, such customers wish to re-fill the cassette and light-sealingly mate it with the dispenser of my patented conception. To meet this demand, it has been necessary to define cassettes which can be re-opened, and refilled with roll, sheet materials, and such cassette which do not need to employ the camming means of my prior patents.

It is an object of this invention, then, to set forth a cassette assembly which is receivable in a dispenser trough, which may be emptied and refilled, and which has a critical width dimension to insure that it shall effect a light-sealing mating with a trough—similar to the cassette-receiving trough in my patented dispenser.

Especially is it an object of this invention to disclose, for use with a rolled sheet materials dispenser having a cassette-receiving trough with a first, innermost length of a given dimension, and a second, outermost length of another dimension which is greater than said given dimension, and having a first, outermost portion with a width of a prescribed dimension, and a second, inner portion with a width of a specific dimension which is smaller than said prescribed dimension, a cassette assembly, comprising a first, rolled sheet materials-confining section; and a second, rolled sheet materials-outfeeding section; wherein said second section, coupled to said first section, has a trough-engaging portion with means for (a) forming said trough-engaging portion with an overall, effective width of a dimension which is substantially equal to such specific dimension of such a sheet materials dispenser trough, and (b) defining thereat, upon said out-feeding section being mated with such trough, a light-tight, sealing fit of said trough-engaging portion with such second, inner portion of such trough.

Further objects of this invention, as well as the novel features thereof, will become more apparent by reference to the following description taken in conjunction with the accompanying figures, in which:

FIG. 1 is a side elevational view of a cassette assembly according to a first embodiment of the invention, the same being shown matingly nested in a phantomed trough of a dispenser;

FIG. 2 is a bottom view of the cassette assembly of FIG. 1 shown only through an intermediate portion of the length thereof;

FIG. 3 is a front elevational view of the embodiment of FIGS. 1 and 2, taken from the left-hand side of FIG. 1;

FIG. 7 is a cross-sectional view, similar to that of FIG. 4, of a further embodiment of the invention.

Figure 4:
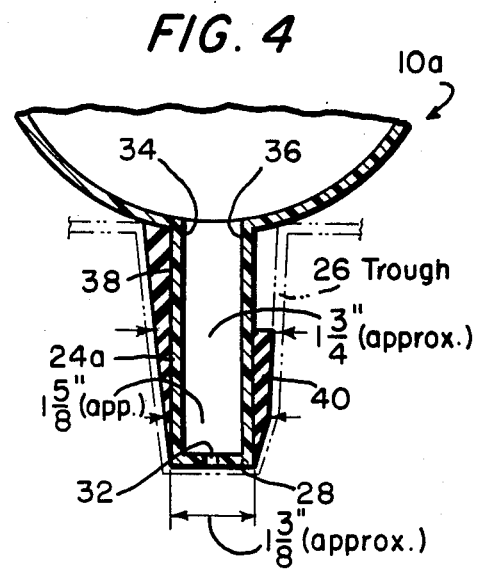
FIG. 4 is a cross-sectional view taken along section 4-4 of FIG. 5 and depicting an alternative embodiment of the invention.

As shown in FIGS. 1-3, a cassette assembly 10, according to a first embodiment of my invention, comprises a first, rolled sheet materials-confining section 12 which is formed of substantially two cylindrical halves 14 and 16. The two halves 14 and 16 are joined by means of a plastic hinge 18, and have cooperative grooves and a lip (not shown) along a parting line or seam 20. How the halves are closed upon each other with closure seaming is not detailed here, such being a well known practice in the prior art. Too, opposite ends of the section 12 have trunnions 22 (only one being shown) upon which to journal a roll of sheet material. This journaling of roll sheet material, too, is well known in this technology, and requires no detailed disclosure here.

Projecting from cylindrical half 16 is a sheet materials out-feeding section 24. It is specifically configured to nest, matingly with a trough 26, shown only in phantom, having particular dimensions, and a particular conformation. The trough 26 has a first, innermost length of thirteen inches, and a second, outermost length of thirteen and three-eighths inches; further, it has a first, outermost portion with a width of approximately one and fifteen-sixteenths inches, and a second, inner portion with a width of approximately one and five-eighths inches.

It is my determination that it is something of a manufacturing chore to so define the mating, confronting surfaces of the trough 26, through its full depth, and the walls of the out-feeding section 24, that they will perfectly inter-fit and effect light-sealing fully therealong. Too, the outermost end of the out-feeding section 24 has an end wall 28 thereat. It is with no less difficulty to insure that this end wall will fully, and light-sealingly seat in the bottom of the trough 26. Accordingly, I have selected an inner portion of the trough 26, and its specific dimensional width thereat, as a location whereat to insure that there is light-tight sealing with a nesting or mating cassette assembly. With reference to FIG. 1, the selected location is where the trough 26 has a width of approximately one and ⅝-ths inches. In the manufacturing of the cassette assembly 10, therefore, it is essential that it have a trough-engaging portion with an overall, effective width of a dimension which is substantially equal to the aforesaid one and five-eighths inches, thereby to define thereat a light-tight, sealing fit of such portion with the selected location in the trough. This is clearly shown in FIG. 1.

The out-feeding section 24 of the cassette assembly 10 has a median plane 30, and the end wall 28 has an outlet 32 formed therein, through which to disgorge materials. The outlet 32 is formed along a centerline of the wall 28, albeit is offset from, and parallel with the plane 30.

The opposite ends of the out-feeding section 24 are slightly tapered, to mate fully with the inwardly diminishing conformation of the trough 26. Thus, the out-feeding section 24 has a terminal length of approximately thirteen inches, and a length contiguous with the cylindrical section 12 of approximately thirteen and three-eighths inches. This can be seen in FIG. 3.

Figure 5:
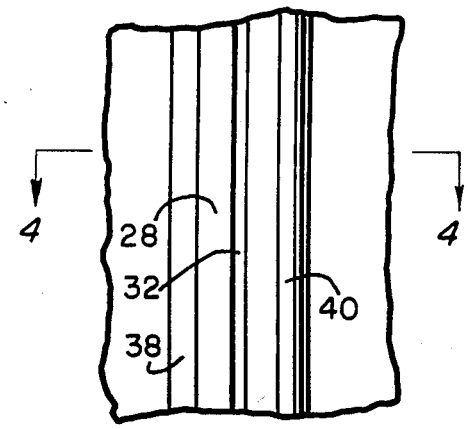
FIG. 5 is a bottom view of the FIG. 4 embodiment showing only a portion thereof.

It is not essential that the out-feeding section of a cassette assembly, according to my invention, be of tapering shape. As shown in FIGS. 4 through 5, the section in question can be quite, simply, rectilinear. Here, the out-feeding section 24a of this alternative cassette assembly 10a has parallel walls 34 and 36, joined in a same wall 28. However, to insure that this out-feeding section 24a has an overall, effective width of a dimension substantially equal to the aforesaid selected portion of the trough 26, to define thereat a light-tight seal with the latter portion, lateral seals are employed. A long, wedge-shaped seal 38 is cemented to the wall 34, and another thicker seal 40 is cemented to wall 36. The seals 38 and 40 cooperate with the walls 34 and 36 to define the critical width dimension of one and five-eighths inches. Such is the specific, effective overall width which is necessary to light-seal thereat with the like-dimensioned trough 26.

Figure 6:
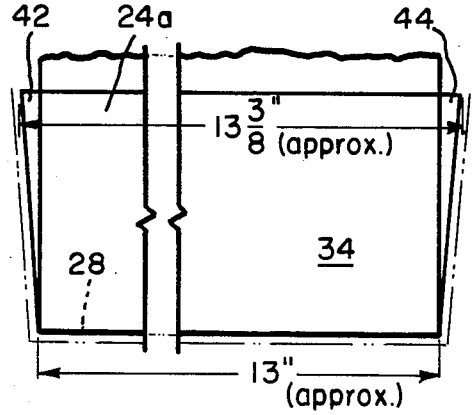
FIG. 6 is a front elevational view of the FIGS. 4 and 5 embodiment.

In that is is simpler to manufacture the ends of the walls 34 and 36 with straight, parallel edges, as shown in FIG. 6, further wedge-shaped seals 42 and 44 need to be adhered to the axial end walls (not shown) which join the walls 34 and 36.

It will be self-evident, now, that the out-feeding section of a cassette assembly, according to my invention, can take differing conformations and dimensions. In FIG. 7 a further alternative embodiment 24b is shown. In this exemplary form, the section 24b defines a narrow throat of walls 34a and 36a. Here then, seals 46 and 48 of sufficient thickness and of proper shape are cemented to the walls 34a and 36a to produce the necessary light-sealing across the selected one and five-eighths width dimension of the trough 26.

While I have described my invention in connection with specific embodiments thereof, it is to be clearly understood that this is done only by way of example and not as a limitation to the scope of my invention, as set forth in the objects thereof, and in the appended claims. For example, while I disclose the invention as having the out-feeding section of the cassette assembly 10 (or 10a, 10b) set into the trough 26, the alternative arrangement is comprehended by my invention. The walls 34 and 36 (or 34a and 36a) can be formed with a space therebetween of such width that out-feeding section 24 (or 24a, 24b) can be fitted onto the outer walls of the trough 26. In this, then, the space or void between the walls 34 and 36 (or 34a and 36a) has a transverse dimension equal to some given, overall width of the trough 26 and, also, any terminal end wall—such as wall 28—is dispensed with. My dispenser, as defined in the aforesaid U.S. Pat. Nos. 4,455,905 and 4,535,664, has a trough formed of enclosing walls which, externally, are substantially straight, so it presents no difficulty in forming the out-feeding sections 24 of the cassette assembly 10 (or 10a, 10b) with correspondingly straight, or substantially straight walls 34 and 36 (or 34a, 36a) to sealingly grasp the walls of the trough therebetween.

I claim:

1. For use with a rolled sheet materials dispenser having a cassette-receiving trough with a first, innermost length of a given dimension, and a second, outermost length of another dimension which is greater than said given dimension, and having a first, outermost portion with a width of a prescribed dimension, and a second, inner portion with a width of a specific dimension which is smaller than said prescribed dimension, a cassette assembly, comprising:
   a first, rolled sheet materials-confining section; and
   a second, rolled sheet materials-out-feeding section coupled to said first section; wherein
   said second section has a trough-engaging portion with means for (a) forming said trough-engaging portion with an overall, effective width of a dimension which is substantially equal to such specific dimension of such a sheet materials dispenser trough, and (b) defining thereat, upon said out-feeding section being mated with such trough, a light-tight, sealing fit of said trough-engaging portion with such second, inner portion of such trough;
   said means comprise substantially parallel walls projecting from said first section; and
   at least one strip of material of light-sealing property adhered to one of said walls.

2. A cassette assembly, according to claim 1, wherein:
   said means comprises strips of light-sealing material adhered to each of said walls.

3. A cassette assembly, according to claim 1, wherein:
   said second section further has a median plane, and a materials outlet; and said materials outlet is offset from and parallel with said median plane.

4. A cassette assembly, according to claim 3, wherein:
   said second section further has a furthermost end wall;
   said materials outlet is formed in said end wall along a centerline thereof; and
   said centerline is offset from said median plane.

5. A cassette assembly, according to claim 1, wherein:
   said walls are joined, at opposite ends thereof, in narrow, transverse walls; and
   at least one of said transverse walls has a strip of light-sealing material adhered thereto.

6. A cassette assembly, according to claim 1, wherein:
   said walls are joined, at opposite ends thereof, in narrow, transverse walls; and
   each of said walls has a strip of light-sealing material adhered thereto.

7. In combination with a rolled sheet materials dispenser having a cassette-receiving trough with a first, innermost length of a given dimension, and a second, outermost length of another dimension which is greater than said given dimension, and having a first, outermost portion with a width of a prescribed dimension, and a second, inner portion with a width of a specific dimension which is smaller than said prescribed dimension, a cassette assembly, comprising:
- a first, rolled sheet materials-confining section; and
- a second, rolled sheet materials-out-feeding section coupled to said first section; wherein
- said second section has a trough-engaging portion with means for (a) forming said trough-engaging portion with an overall, effective width of a dimension which is substantially equal to such specific dimension of said trough, and (b) defining thereat, upon said out-feeding section being mated with said trough, a light-tight, sealing fit of said trough-engaging portion with said second, inner portion of said trough; and
- said means comprise substantially parallel walls projecting from said first section, and a strip of light-sealing material adhered to at least one of said walls.

8. The combination, according to claim 7, wherein:
- said means comprise strips of light-sealing material adhered to each of said walls.

9. The combination, according to claim 7, wherein:
- said second section further has a median plane, and a materials outlet; and
- said materials outlet is offset from and parallel with said median plane.

10. The combination, according to claim 9, wherein:
- said second section further has a furthermost end wall;
- said materials outlet is formed in said end wall along a centerline thereof; and
- said centerline is offset from said median plane.

11. The combination, according to claim 7, wherein:
- said walls are joined, at opposite ends thereof, in narrow, transverse walls; and
- at least one of said transverse walls has a strip of light-sealing material adhered thereto.

12. The combination, according to claim 7, wherein:
- said walls are joined, at opposite ends thereof, in narrow, transverse walls; and
- each of said walls has a strip of light-sealing material adhered thereto.

* * * * *